Figure 1:
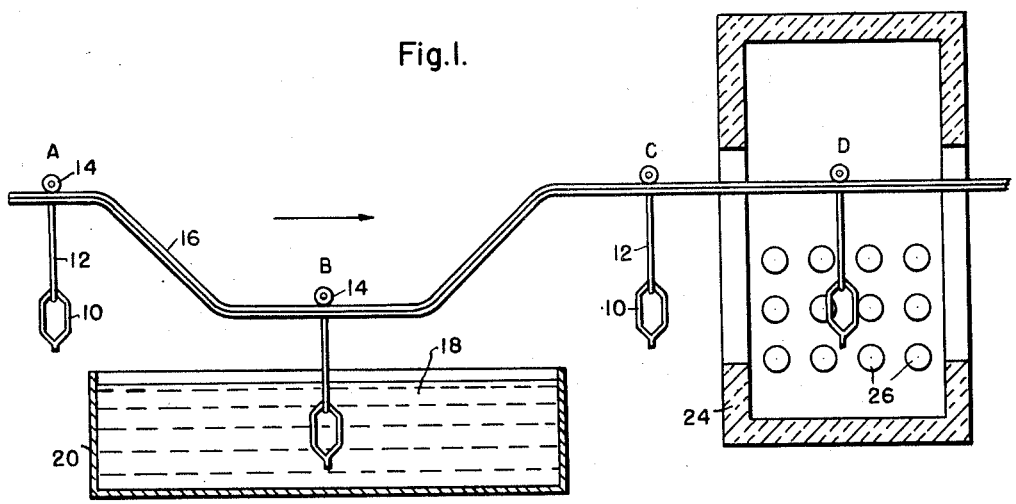

Varnish Coating comprising Alkyd Modified Phenolic Resin with from 0.05% to 0.5% by weight of Methylphenylpolysiloxane INVENTORS
William R. Moore
and Gordon P. Gibson.

United States Patent Office 2,836,740
Patented May 27, 1958

2,836,740

WATER PROOF VARNISH AND ELECTRICAL MACHINES AND MEMBERS TREATED THEREWITH

Gordon P. Gibson, Orchard Park, and William R. Moore, Buffalo, N. Y., assignors to Westinghouse Electric Corporation, East Pittsburgh, Pa., a corporation of Pennsylvania Application July 28, 1954, Serial No. 446,198

5 Claims. (Cl. 310—45)

This invention relates to water proofing varnish treatments for electrical motors, and other electrical apparatus.

In order to insulate and protect electrical motors and other electrical equipment from moisture, dirt, and other undesirable external influences, it is a common practice to dip or impregnate electrical coils, stators, armatures, and the like in suitable resinous varnishes.

Total immersion of an ordinary electrical member in water occurs only rarely. However, electrical equipments, such as motors, are often located in places where high humidities or occasional wetting does take place. Thus, in numerous locations, such as on board a ship, and along the seashore or other bodies of water, high humidities are frequently present. In numerous seafaring and industrial activities in these localities, the elecrtical equipment may be subjected to both high humidity and occasional spraying and splashing with both fresh water, sea water, and aqueous chemical solutions. Also it is quite common in chemical industry for electrical equipment to be subjected to various organic solvents, such as alcohol, gasoline, toluene and the like, both in liquid and vapor form. These solvents may dissolve or weaken any varnish coating.

It is highly desirable to keep the penetration of water and water vapor in particular to such a low value that the electrical or ohmic resistance of the insulation never goes below certain minimum values. For the same thickness of coating, a resinous material that is readily wetted by water will permit the penetration of water therethrough rapidly and in such amounts as to lower the electrical resistance of the applied varnish to such a value that failure is much more likely than if the resinous varnish is hydrophobic and does not permit the surface to be wetted by the water. A good indication of the degree of hydrophobicity of a varnish coating is to apply a spray of water to the member and to observe over a period of time whether the water spreads over the surfaces or stands out in drops, the latter condition indicating a desirable hydrophobic varnish material.

An important characteristic of resinous varnish compositions to be applied to electrical motors and other electrical members is that it may be applied successfully as a plurality of coatings. Certain varnish compositions are of such a nature that a subsequent coating will adhere quite poorly thereto. The second coating will either draw away from high spots in coils leaving uncoated areas or will be so poorly adherent that it will flake or peel readily therefrom. It is quite necessary, therefore, that two or more coatings of the resinous varnish composition when applied to a given member will cover it completely and bond thoroughly.

An object of the invention is to provide a resinous varnish composition which when applied to electrical members will produce a relatively permanent water proof coating thereon, such composition being satisfactorily applied as a plurality of coatings and characterized by toughness, hardness and other necessary properties.

Another object of the invention is to provide an electrical member impregnated with a varnish composition that is substantially completely and permanently resistant to both water and water vapor and characterized by outstanding physical properties.

A further object of the invention is to provide for combining a predetermined amount of certain organopolysiloxane resin and a phenolic resin capable of producing a permanently water proofing coating, and capable of being satisfactorily applied in two or more coating operations.

Other objects of the invention will, in part, be obvious and will, in part, appear hereinafter.

Figure 2:
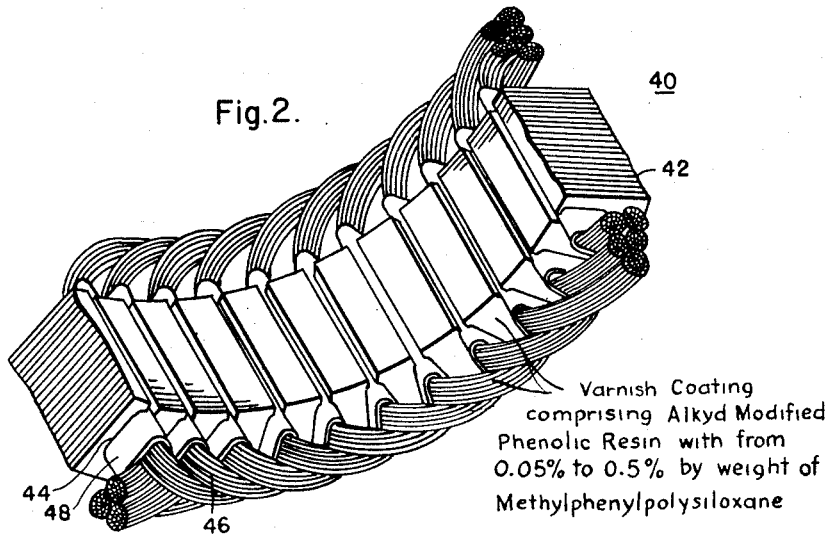

For a better understanding of the nature and object of the invention, reference should be had to the following drawing, in which:

Figure 1 is a view in elevation partly in section of a conveyor system for treating coils; and Fig. 2 is a fragmentary view in perspective of a stator.

We have discovered a novel varnish composition having outstanding physical and thermal resistance properties, which composition when applied as a varnish coating to electrical members is substantially permanently water proof. More specifically, the composition of our invention comprises an oil-modified-alkyd-phenolic resin and from 0.05% to 0.5% based on the weight of the phenolic resin, of a specific methyl phenyl polysiloxane. This composition when dissolved in suitable solvents to produce a varnish may be applied to electrical members one or more times with baking between successive coatings, to produce a well bonded permanently water proof coating on the electrical members. Such applied coatings are tough and hard and constitute an outstanding electrical varnish. A coating of the varnish resists the action of most organic solvents, so that its waterproofness is not impaired even though exposed to them for long periods of time.

In preparing the resinous composition of this invention, we initially prepare a thermosetting alkyd modified phenolic resin which comprises the reaction product of from 40 to 70 parts by weight of an alkyd resin, and in particular, an oil modified alkyd resin or unsaturated glyceride, such for example, as maleinized linseed oil, and the like, and from 60 to 30 parts by weight of the following phenol aldehyde reaction product. The alkyd resin may comprise the reaction product of maleic anhydride with linseed oil alone or with a polyhydric alcohol such as glycerol or a glycol. Thus, 100 parts of linseed oil may be reacted with 3 to 8 parts by weight of maleic anhydride and after suitable ester interchange occurs, glycerol equal to approximately ⅔ the moles of maleic anhydride is added. The product will have a viscosity of W to Y on the Gardner scale. Alternatively, a glycerol-maleate-phthalate alkyl, or a drying oil modified glycerol-maleate-phthalate may be used. Fumaric acid can be employed in place of the maleic anhydride. The phenol aldehyde reaction product is produced by reacting one mole of a phenol, such as phenol, cresylic acid, m,p-cresol, para-tertiary butyl phenol mixtures of two or more phenols, including a small proportion of a diphenylol, such as diphenylolpropane, and from 1.2 to 2.0 moles of formaldehyde or a methylene engendering polymer of formaldehyde such as paraformaldehyde. The phenol and formaldehyde are reacted in the presence of an alkaline catalyst, such as an amine, for example, ethylene diamine, sodium hydroxide, or ammonia, in the proportion of from 0.2% to 2% or more based on the weight of the phenol. The phenol and formaldehyde and the catalyst may be admixed simultaneously in a reaction vessel and reacted by refluxing at temperatures not exceeding 110° C. for from ½ hour to 2 hours or more. The alkali catalyst can be neutralized with an acid such as sulfuric acid after refluxing. The reaction mixture is then subjected to a vacuum to withdraw water with the temperature applied to the vessel increasing until the contents reach a temperature of, for example, from 110° C. to 140° C. until a resin having a ball and ring value of 75° C. to 110° C. is produced. The resinous product is then poured into a pan where it solidifies, after which it is crushed to a powder. The powdered phenolic resin is admixed with the alkyd resin or oil modified alkyd resin and heat bodied at temperatures of 120° to 160° C. for a period of time of from ½ to an hour at the lower temperatures to about 10 minutes to 15 minutes at the higher temperatures. The heat bodied resin is then dissolved in toluene, xylene, or benzene, for example, or mixtures of two or more to produce heat curable varnish solutions having from 50% to 70% by weight of resin solids.

The methyl phenyl polysiloxane employed in the practice of this invention is preferably a polymer of a molecular weight of from about 400 to 1000 and containing from 15 to 40 mole per cent of monomethyl siloxane units ($CH_3SiO_{1.5}$), from 25 to 55 mole percent phenyl siloxane units ($C_6H_5SiO_{1.5}$), and from 30 to 50 mole percent of methyl phenyl siloxane units ($CH_3C_6H_5SiO$). The methyl phenyl polysiloxane may be prepared by admixing, hydrolyzing, and co-condensing mixtures of the respective chlorosilanes or alkoxides having the methyl, phenyl, and methyl phenyl radicals attached thereto. The hydrolysis and condensation may be carried out in water mixed with toluene or other benzenoid solvents.

The following examples illustrate the practice of the invention.

EXAMPLE

A. *Preparation of alkyd modified phenolic resin*

Into a reaction vessel there is introduced:

| | Parts |
|---|---|
| Paratertiarybutyl phenol | 100 |
| Formaldehyde (37%) | 98 |
| Sodium hydroxide | 0.4 |
| Diphenylol propane | 21 |

The mixture is refluxed at a temperature not in excess of about 100° C. for 1 hour. The refluxed product is then treated with sulfuric acid to bring the pH to a value of 6, and the reaction product is subjected to vacuum and heat applied until the vessel temperature reaches 120° C. The vacuum is then broken and heating continued until the resin has a ball and ring value of 90° C. It is poured into a pan, wherein it solidifies on cooling. The cooled solid phenolic resin is crushed and the powdered resin is admixed with an equal weight of a linseed oil modified glycerol-maleate-phthalate resin. The mixture is heat bodied for 15 minutes at 140° C. and dissolved in toluene. The varnish contains approximately 62% by weight of resin solids.

B. *Preparation of siloxane*

Equimolar proportions of methyl silicon trichloride, phenyl silicon trichloride, and methyl phenyl silicon trichloride are admixed, and this mixture is added slowly over a period of several hours to a mixture comprising two volumes of toluene and three volumes of water, the total weight of the water to the mixture being approximately four times the weight of the chlorosilanes. The temperature of the water and toluene during the admixture is maintained at approximately 25° C. After the completion of the adding of the chlorosilanes to the water-toluene mixture, the entire mixture is agitated vigorously for 15 minutes and permitted to settle for 15 minutes. The aqueous portion is then decanted off and discarded, while the toluene portion containing siloxane copolymer resin is washed a number of times with hot water. A small amount of ammonium hydroxide (about 1 to 2% by weight) is added to one of the latter wash waters, being followed by one or two final washes with water alone. The toluene containing layer is then distilled to a temperature of approximately 150° C. leaving the organo-polysiloxane resin. This organo-polysiloxane is then bodied by heating to 140° C. for 12 hours. The resulting siloxane dissolved in an equal weight of toluene will have a viscosity of approximately 265 centistokes.

C. *Preparation of combined composition*

To 100 parts of the alkyd modified phenolic resin of part A of this example there is added 0.25 part by weight of the organo-polysiloxane resin of part B of this example. The admixture is preferably prepared in the following manner: One volume of the organo-polysiloxane resin dissolved in sufficient toluene to produce a 50% solution is admixed with 5 volumes of the varnish of part A of this example. This mixture is thoroughly stirred for several minutes and then the mixture is slowly stirred into and blended into the remainder of the oil modified phenolic varnish of part A of this example with thorough stirring to insure complete blending. The resulting composition will have a viscosity of 50 to 60 seconds at 25° C. using Demmler cup #1, that is, about 130 to 200 centipoises.

Coils, motor stators and other electrical members to be treated with the varnish composition may be suspended and treated on a conveyor, as shown in Fig. 1 of the drawing. In this figure coils 10 hanging from bars 12 mounted on rollers 14 pass from a loading station A on the monorail track 16 from left to right to the dip position B. At position B, the coils are immersed in the phenolic-polysiloxane varnish composition 18 of this invention contained in a tank 20. After a suitable dip time, approximately 15 minutes, for example, the coils are then moved to position C where they are allowed to drain briefly and thence to position D within an oven 24 where the applied varnish composition is baked by heat applied through infrared lamps 26. The coils are then moved from the oven and unloaded if a single dip is adequate. Usually the coils are recycled through the composition 18 and baked a second, a third, or more times, in order to provide the required thickness of varnish thereon.

In one specific instance, after a first varnish dip for 15 minutes, motor stators were baked for 3 hours at a maximum temperature of 150° C. and allowed to cool to a temperature of approximately 100° C. when they were dipped a second time in the composition 18 for a period of time of approximately 6 minutes. They were then baked for 3 to 4 hours at a temperature of 150° C. The resulting double coating of varnish was found to cover the entire stator windings and magnetic core, as well as the slot cell liner and the like with a smooth uniformly thick film of cured resinous insulation. The insulation was found to be quite hydrophobic. When some water was sprayed on the insulation it immediately drew up into globules and did not wet and spread over the varnished surfaces. The resinous composition resisted the penetration of water and water vapor. Furthermore, the stators could be recoated with the same varnish used previously, or other varnishes with completely satisfactory coverage.

We have found that the use of more than 0.5% of the polysiloxane based on the weight of the oil modified phenolic resin in varnish produces unsatisfactory results in that subsequently applied coatings of the same or different varnishes will pull away from sharp edges and corners of the copper, steel, etc. of the electrical members. At any rough spot or projection "fish eyes" will form; these fish eyes being bare spots of approximately ¼ inch in diameter, where the second coating fails to adhere to the first coating and pulls away. The use of less than 0.05% of the organo-polysiloxane based on the weight of the phenolic resin in the varnish fails to give good water and water vapor protection.

The siloxane compositions of the present invention are permanently waterproof. We have subjected electrical equipment coated with the varnish of this invention to dipping in alcohol, toluene and other commonly used organic solvents and have found that the waterproofness is not impaired. Superficial coatings of hydrophobic materials are often completely dissolved away under such treatment.

Referring to Fig. 2 of the drawing, there is illustrated a fragmentary portion of stator 40 treated in accordance with the present invention. The stator comprises a magnetic core 42 provided with a plurality of slots 44 in which are disposed electrical windings 46 comprising electrically insulated wire, for example, enameled wire, within each of which is disposed slot cell insulation 48 comprising paper, cellulose acetate, films of polyethyleneglycol terephthalate resin and the like. The stator dipped in the compositions of the present invention is provided with a protective and insulative coating over the magnetic core 42, the electrical windings 46 and the slot cell insulation 48. In some cases, a motor frame may be attached to the core 42, and it will similarly be rendered more water resistant though it will be appreciated that there is no electrical insulating problem involved in varnishing the motor frame.

We have found further unexpected improvements in the properties of our compositions by including the critical amount of methyl phenyl polysiloxane resin as disclosed herein. Thus, on testing a varnish composition comprising 0.25% by weight of the methyl phenyl polysiloxane resin combined with the alkyd modified phenolic resins, we found that the coatings of the varnish had double the thermal life of the same oil modified varnish without the methyl phenyl polysiloxane resin, that is, at elevated temperatures our varnish coatings lasted twice as long as coatings of the same varnish without the siloxane.

The coatings of the varnish composition of this invention may be as thin as 0.0005 inch in thickness, though it is preferred to apply much heavier coatings on electrical coils. In some cases the electrical coils, stators and the like are dipped many times in the compositions of this invention and baked after each dip in order to provide a suitable thickness of cured varnish. Also an initial coating of another selected varnish may be applied to the electrical member, the member baked to cure the coating and then one or more coatings of the varnish composition of this invention are applied and baked.

While we have secured particularly good results with the alkyd modified phenolic varnishes combined with methyl phenyl polysiloxane to provide the compositions disclosed herein, it will be understood that phenolic varnishes originally reacted with tung oil and then heat bodied with alkyd resins and oil modified alkyd resins may be similarly treated with good results.

There are numerous oil modified phenolic and phenolic-alkyd resin varnishes available that may be combined with the siloxanes of this invention.

It will be understood that the above description and drawing are illustrative and not limiting.

We claim as our invention:

1. In an insulated electrical member, an electrical winding, a coating of cured resinous insulation applied to the winding, and an additional exterior coating of a thickness of at least 0.0005 inch superimposed on and covering the cured resinous insulation to render the insulated member permanently highly moisture resistant, at least the exterior coating comprising an alkyd resin modified phenolic resin combined with from 0.05% to 0.5% of the weight thereof of a methyl phenyl polysiloxane containing from 15 to 40 mole percent of methyl siloxane ($CH_3SiO_{1.5}$) units, from 25 to 55 mole percent of phenyl siloxane ($C_6H_5SiO_{1.5}$) units and from 30 to 50 mole percent of methyl phenyl siloxane ($CH_3C_6H_5SiO$) units, the alkyd resin modified phenolic resin and the methyl phenyl polysiloxane being thoroughly admixed, and the coating thereof being cured to a thermoset condition on the electrical member.

2. The insulated member of claim 1, wherein the alkyd resin modified phenolic resin comprises the heat-bodied product of from 60% to 30% by weight of a thermosetting phenol aldehyde resin and from 40% to 70% by weight of an alkyd resin.

3. In an electrical motor, a stator, the stator comprising a magnetic core provided with slots, electrical windings comprising insulated wire disposed in the slots, slot insulation between the windings and the magnetic core, a coating of cured resinous insulation applied to the stator, and at least one additional exterior coating of a thickness of at least 0.0005 inch superimposed upon and covering the entire coating of cured resinous insulation to render the stator permanently highly moisture resistant, at least the exterior coating comprising an alkyd resin modified phenolic resin combined with from 0.05% to 0.5% of the weight thereof of a methyl phenyl polysiloxane containing from 15 to 40 mole percent of methyl siloxane ($CH_3SiO_{1.5}$) units, from 25 to 55 mole percent of phenyl siloxane ($C_6H_5SiO_{1.5}$) units, the alkyd resin modified phenolic resin and the methyl phenyl polysiloxane being thoroughly admixed and the coating thereof being cured to a thermoset condition on the electrical member.

4. The insulated motor of claim 3, wherein the alkyd resin modified phenolic resin comprises the heat bodied product of from 60% to 30% by weight of a thermosetting phenol aldehyde resin and from 40% to 70% by weight of an oil modified alkyd resin.

5. The motor of claim 4 wherein all the resinous coatings on the stator comprises the alkyd resin modified phenolic and methyl phenyl polysiloxane resin.

References Cited in the file of this patent

UNITED STATES PATENTS

| Number | Name | Date |
|---|---|---|
| 2,149,805 | Butler | Mar. 7, 1939 |
| 2,258,222 | Rochow | Oct. 7, 1941 |
| 2,524,885 | Clokey | Oct. 10, 1950 |
| 2,561,982 | Hanna et al. | July 24, 1951 |
| 2,575,115 | Linke | Nov. 13, 1951 |